United States Patent
Krishnamurthy

(10) Patent No.: US 9,832,125 B2
(45) Date of Patent: Nov. 28, 2017

(54) CONGESTION NOTIFICATION SYSTEM

(71) Applicant: Dell Products L.P., Round Rock, TX (US)

(72) Inventor: Karthik Krishnamurthy, Chennai (IN)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 14/715,235

(22) Filed: May 18, 2015

(65) Prior Publication Data
US 2016/0344631 A1    Nov. 24, 2016

(51) Int. Cl.
*H04L 12/70*    (2013.01)
*H04L 12/801*    (2013.01)
*H04L 12/825*    (2013.01)
*H04L 12/54*    (2013.01)

(52) U.S. Cl.
CPC ............ *H04L 47/115* (2013.01); *H04L 12/56* (2013.01); *H04L 47/11* (2013.01); *H04L 47/26* (2013.01)

(58) Field of Classification Search
CPC ... H04L 12/569; H04L 65/4092; H04L 47/10; H04L 47/11; H04L 47/12; H04L 47/115; H04L 47/18; H04L 47/26
See application file for complete search history.

(56) References Cited

U.S. PATENT DOCUMENTS

| | | | |
|---|---|---|---|
| 6,741,555 B1 | 5/2004 | Li et al. | |
| 7,957,276 B2 * | 6/2011 | Chang | H04L 47/10 370/230 |
| 9,042,227 B2 * | 5/2015 | Scheffenegger | H04L 47/12 370/231 |
| 2005/0163122 A1 * | 7/2005 | Sahni | H04L 45/50 370/392 |

(Continued)

FOREIGN PATENT DOCUMENTS

| | | |
|---|---|---|
| CN | 103581137 | 2/2014 |
| EP | 2471302 | 7/2012 |
| WO | WO 2013081518 | 6/2013 |

OTHER PUBLICATIONS

Mohammad Alizadeh, Albert Greenberg, David A. Maltz, Jitu Padhye, Parveen Patel, Balaji Prabhakar, Sudipta Sengupta and Murari Sridharam, "DCTCP: Efficient Packet Transport for the Commoditized Data Center," 15 Pages.

*Primary Examiner* — Warner Wong
(74) *Attorney, Agent, or Firm* — Haynes and Boone, LLP

(57) ABSTRACT

A congestion notification system includes a networking device coupling a sender device to a receiver device. The networking device is configured to detect a congestion situation. When the networking device will provide a first congestion notification in a first packet received from the sender device in response to detecting the congestion situation, as well as retrieve sender device information from the first packet and store that sender device information in a (Continued)

database. Following the sending of the first packet to the receiver device, the networking device receives a second packet that was sent from the receiver device prior to the receiver device receiving the first packet. In response to determining that the second packet includes the sender device information that is stored in the database, the networking device provides a second congestion notification in the second packet. The networking device then sends the second packet to the sender device.

20 Claims, 11 Drawing Sheets

(56) References Cited

U.S. PATENT DOCUMENTS

| | | | |
|---|---|---|---|
| 2009/0052326 A1* | 2/2009 | Bergamasco | H04L 47/10 370/236 |
| 2009/0086637 A1* | 4/2009 | DeCusatis | H04L 47/10 370/236.1 |
| 2011/0261696 A1* | 10/2011 | Crisan | H04L 45/00 370/235 |
| 2013/0215733 A1* | 8/2013 | Jiang | H04L 47/12 370/216 |
| 2015/0195209 A1* | 7/2015 | Bottorff | H04L 47/263 370/230 |

* cited by examiner

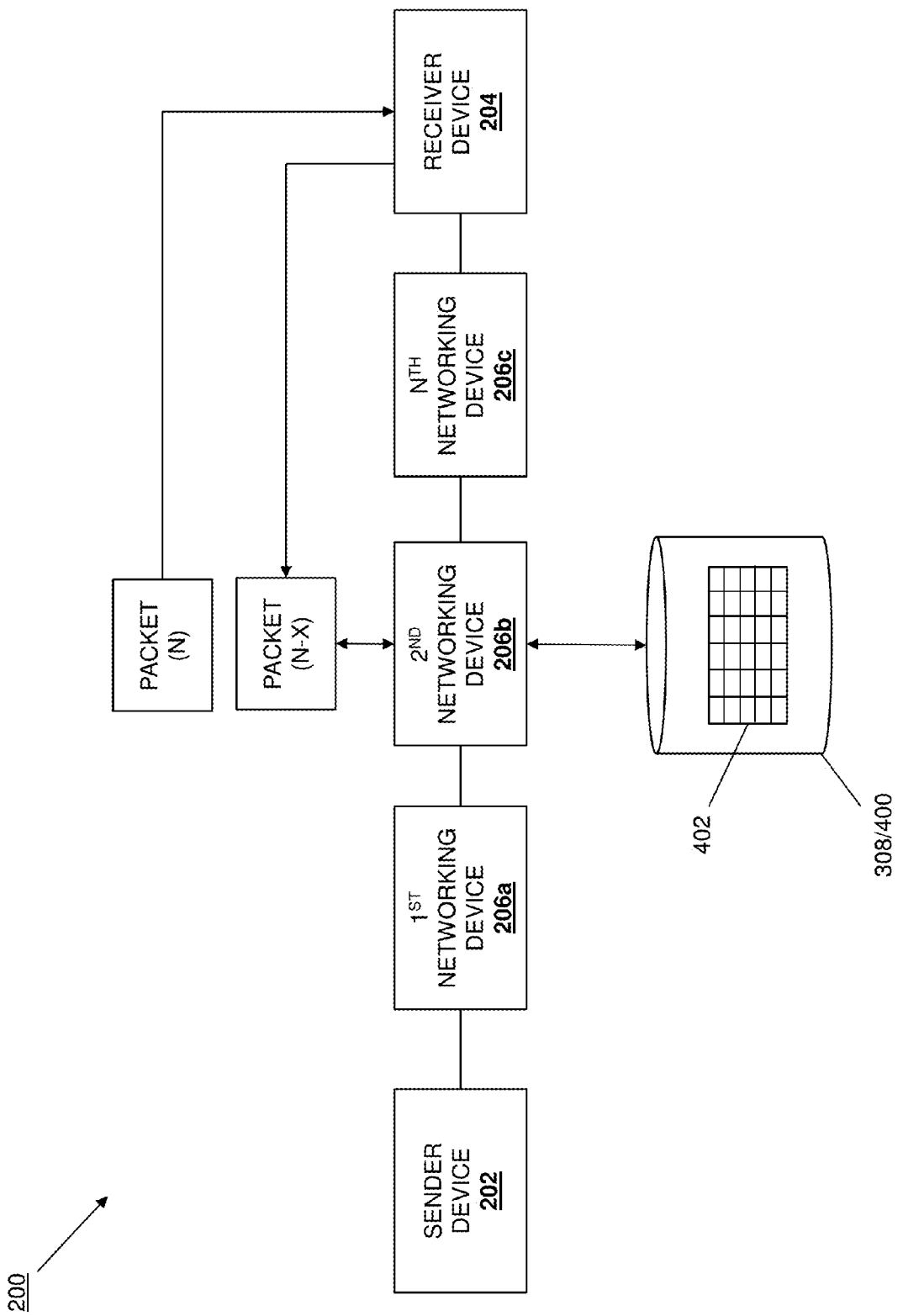

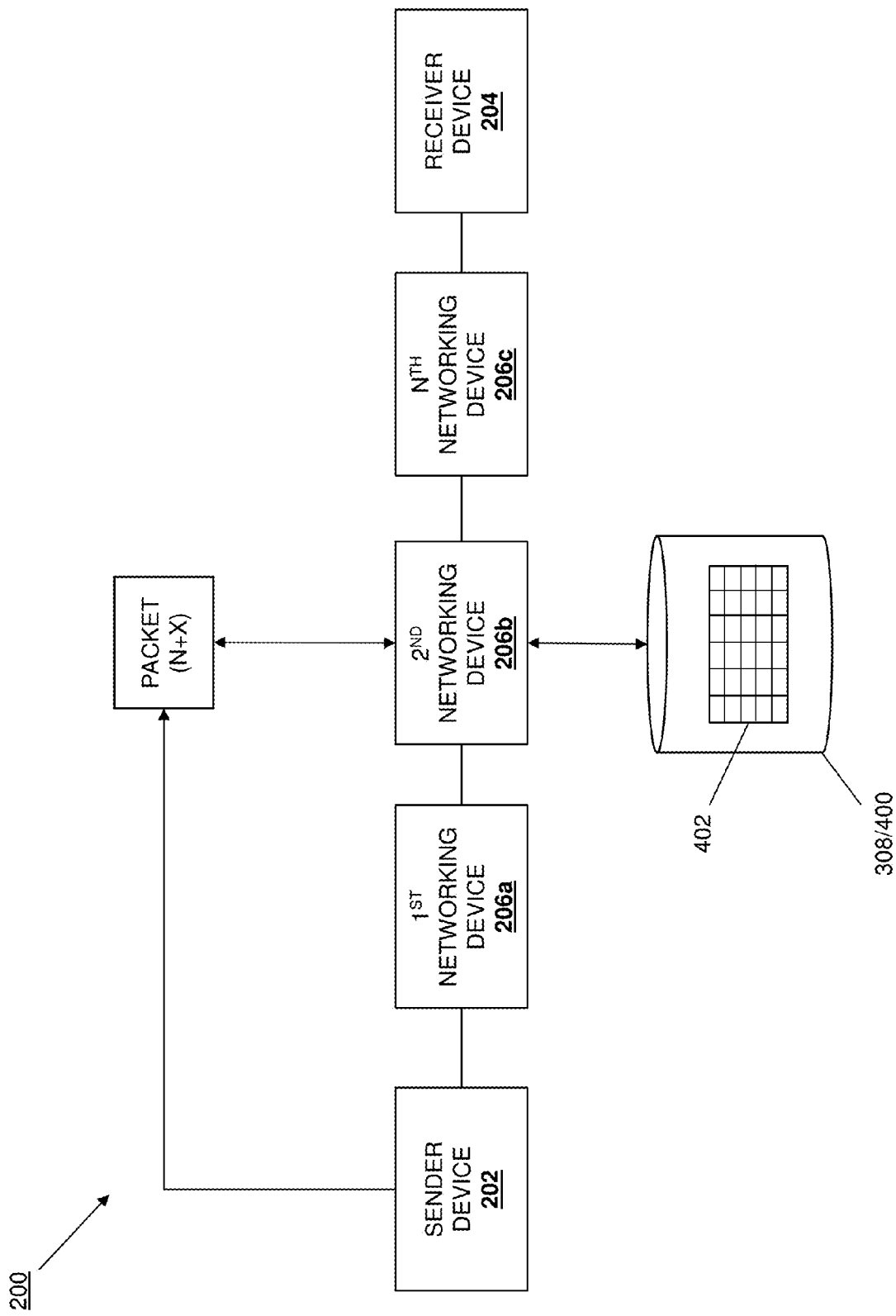

CONGESTION NOTIFICATION SYSTEM

BACKGROUND

The present disclosure relates generally to information handling systems, and more particularly to a congestion notification system for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, client devices and server devices, are typically connected together through a network provided by networking devices to allow those client devices and server devices to communicate. However, when many client devices and server devices are communicating using the network, congestion at one or more of the networking device can occur. Mechanisms for dealing with such congestion have been provided to reduce communication transmission losses due to such congestion. For example, Explicit Congestion Notification (ECN), defined by Request for Comment (RFC) 3168, is an extension to the Internet Protocol and the Transmission Control Protocol that attempts to address the congestion issues discussed above.

In ECN capable systems, when an intermediate switch or router that connects the client device to the server device in the network experiences congestion, that intermediate switch or router will set a Congestion Encountered (CE) bit in a packet received from the client device, and will then forward that packet to the server device. In response to receiving a packet with the CE bit set, the server device will then set an ECN echo bit in the subsequent Transmission Control Protocol (TCP) acknowledgement (ACK), and send that TCP ACK to the client device. When the client device receives the TCP ACK with the ECN echo bit set, the client device will reduce the data transmission window size and packet transmission rate, set a Congestion Window Reduced (CWR) bit in the subsequent packet, and send that packet to the server device. The reduction of the data transmission window size and packet transmission rate reduces the amount of data that is sent by the client device in attempt to reduce congestion in the network caused by that client device. However, in such conventional congestion notification systems, packets may be dropped due to congestion between the time the intermediate switch or router sends the packet with the CE bit set to the server device, and the time the client device reduces the data transmission window size and packet transmission rate in response to receiving the TCP ACK with the ECN echo bit set. Such congestion related packet dropping can be exacerbated if the packet with the CE bit set or the TCP ACK with the ECN echo bit set are dropped, as in such cases the client device must wait for a timeout to be notified of a problem with communication transmission.

Accordingly, it would be desirable to provide an improved congestion notification system.

SUMMARY

According to one embodiment, an information handling system (IHS) includes a processing system; and a memory system that includes instructions that, when executed by the processing system, cause the processing system to provide a congestion notification engine that is configured to: detect a congestion situation; receive a first packet from a sender device and, in response to detecting the congestion situation, provide a first congestion notification in the first packet, retrieve sender device information that is included in the first packet and store the sender device information in a database, and send the first packet to a receiver device; receive a second packet from the receiver device that was sent by the receiver device prior to the receiver device receiving the first packet; determine that the second packet includes the sender device information that is stored in the database and, in response, provide a second congestion notification in the second packet; and send the second packet to the sender device.

BRIEF DESCRIPTION OF THE DRAWINGS

FIG. 6c is a schematic view illustrating an embodiment of the congestion notification system of FIG. 2 operating according to the method of FIG. 5.

FIG. 6e is a schematic view illustrating an embodiment of the congestion notification system of FIG. 2 operating according to the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
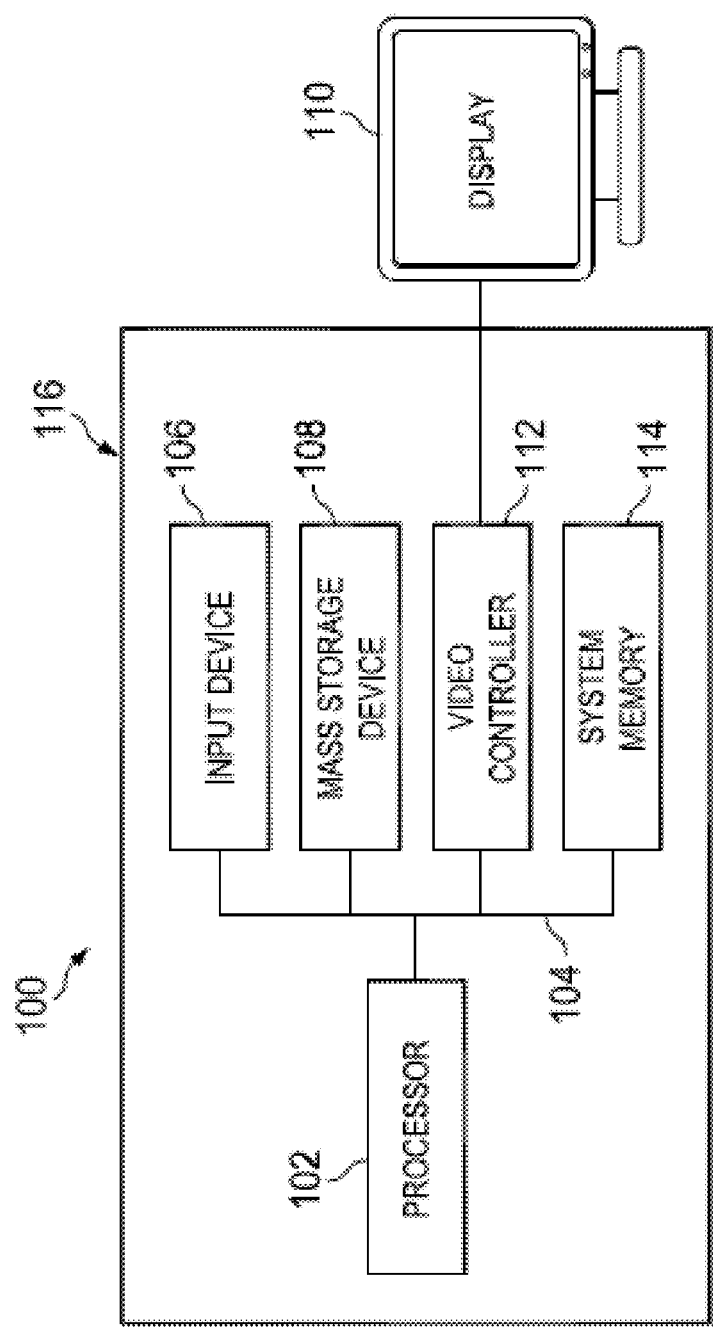
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
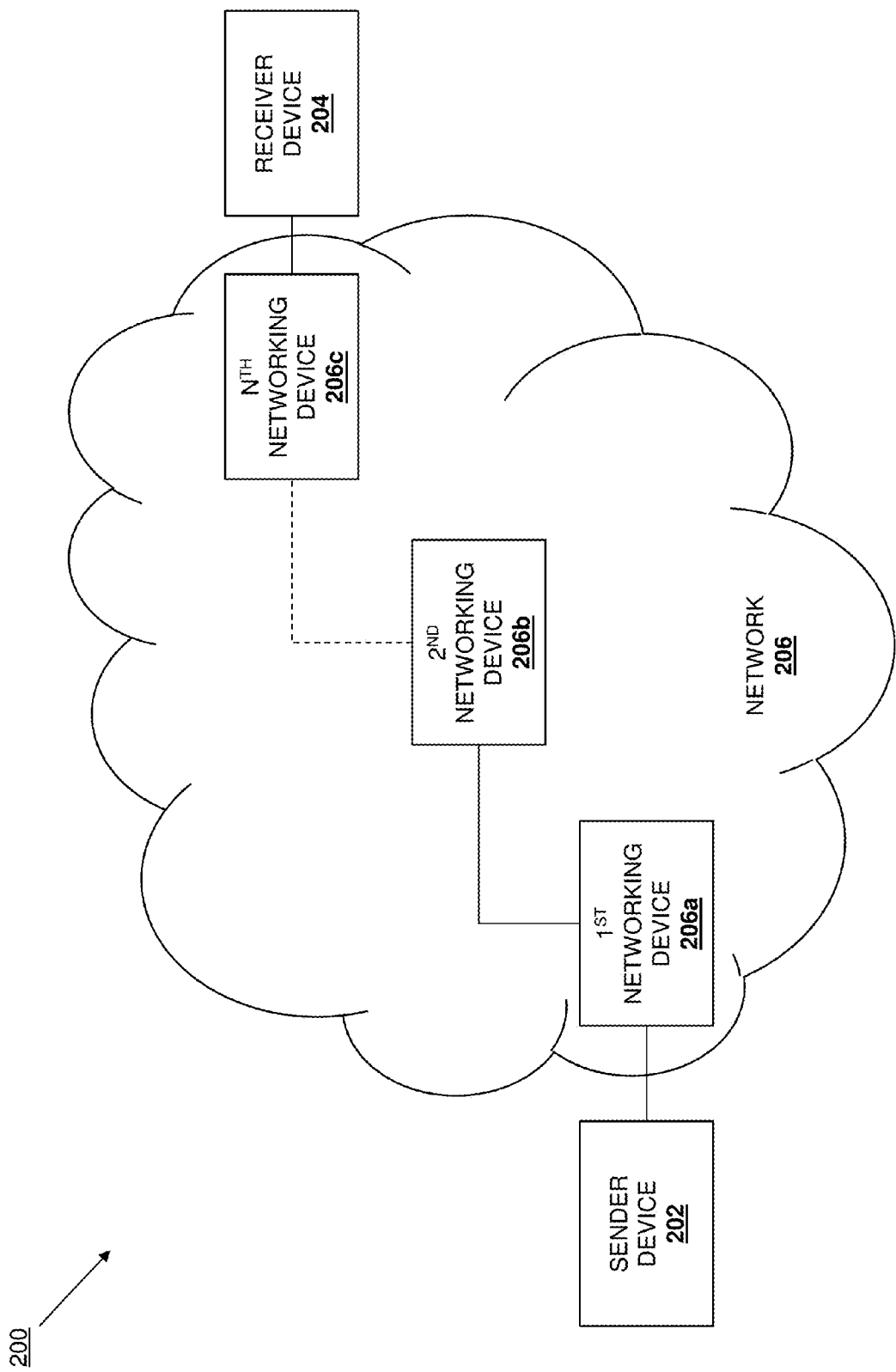
FIG. 2 is a schematic view illustrating an embodiment of a congestion notification system.

Referring now to FIG. 2, an embodiment of a congestion notification system 200 is illustrated. The congestion notification system includes a sender device 202 that is coupled to a receiver device 204 through a network 206. In an embodiment, either or both of the sender device 202 and the receiver device 204 may be the IHS 100 discussed above with reference to FIG. 1 and/or include some or all of the components of the IHS 100. In specific embodiments, either or both of the sender device 202 and the receiver device 204 may be any of a desktop computing system, a laptop/notebook computing system, a tablet computing system, a phone, a server computing system, a storage computing system, a monitoring computing system, and/or a variety of other computing systems known in the art. In the embodiments discussed below, the network 206 is the Internet, but in other embodiments, the network 206 may be a local area network (LAN) and/or a variety of other networks known in the art. The network 206 includes a plurality of networking devices, including the first networking device 206a, the second networking device 206b, and up to the $N^{th}$ networking device 206c in the illustrated embodiment. While specific types, numbers, and configurations of the sender devices, receiver devices, and networking devices are illustrated and discussed herein, one of skill in the art in possession of the present disclosure will recognize that any number, types, and configurations of sender devices, receiver devices, and networking devices will fall within the scope of the present disclosure.

Figure 3:
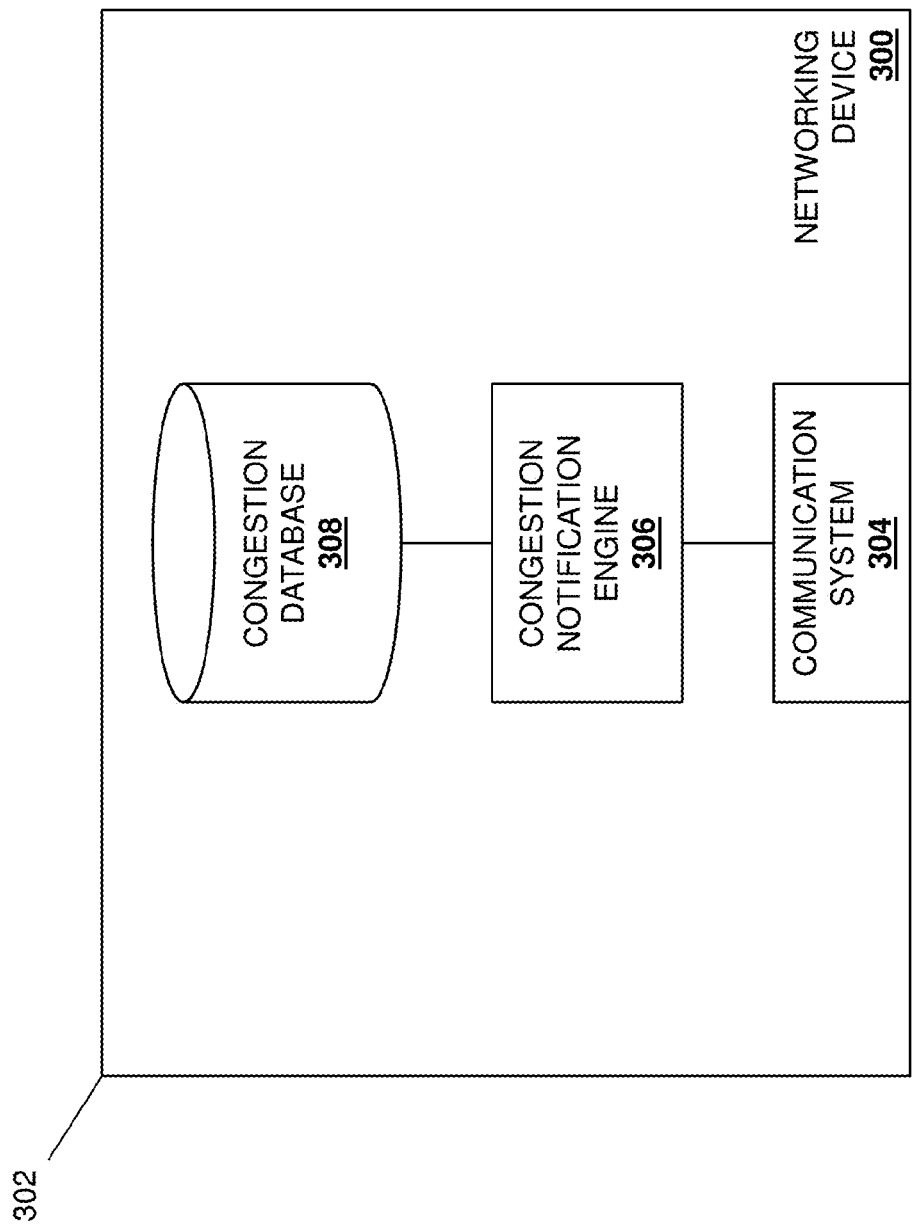
FIG. 3 is a schematic view illustrating an embodiment of a networking device used in the congestion notification system of FIG. 2.

Referring now to FIG. 3, an embodiment of a networking device 300 is illustrated. In an embodiment, the networking device 300 may be the IHS 100 discussed above with reference to FIG. 1 and/or may include some or all of the components of the IHS 100. In an embodiment, the networking device 300 may be any or all of the networking devices 206a, 206b, and up to 206c illustrated in FIG. 2. In the embodiments discussed below, the networking device 300 may be a switch or a router, but one of skill in the art in possession of the present disclosure will recognize that the teachings of the present disclosure may be applied to a variety of other networking devices known in the art. The networking device 300 includes a chassis 302 that houses a communication system 304 that may include a variety of different communication system components (e.g., a network interface controller (NIC), ports, etc.) that provide a variety of communication systems known in the art. In a specific embodiment, the communication system 304 is configured to couple to the Internet and/or a variety of other networks known in the art.

The chassis 302 of the networking device 300 may house a processing system (not illustrated, but which may be substantially similar to the processor 102 discussed above with reference to FIG. 1) and a memory system (not illustrated, but which may be substantially similar to the system memory 114 discussed above with reference to FIG. 1) that includes instructions that, when executed by the processing system, cause the processing system to provide a congestion notification engine 306 that is coupled to the communication system 304 (e.g., via a coupling between the processing system and the communication system 304) and that is configured to perform the functions of the congestion notification engines and networking devices discussed below. The networking device 300 also includes a congestion database 308 that may be included in a storage system (not illustrated, but which may be substantially similar to the storage device 108 discussed above with reference to FIG. 1) that is housed in the chassis 302 and coupled to the congestion notification engine 306 (e.g., via a coupling between the processing system and the storage device). While the congestion database 308 is illustrated and described as included on a storage system that is housed in the chassis 302 of the networking device 300, the congestion database 308 may be included on a storage system that is located outside of the chassis 302 of the networking device 300 and coupled to the congestion notification engine 306 (e.g., through a network via the communication system 304).

Figure 4:
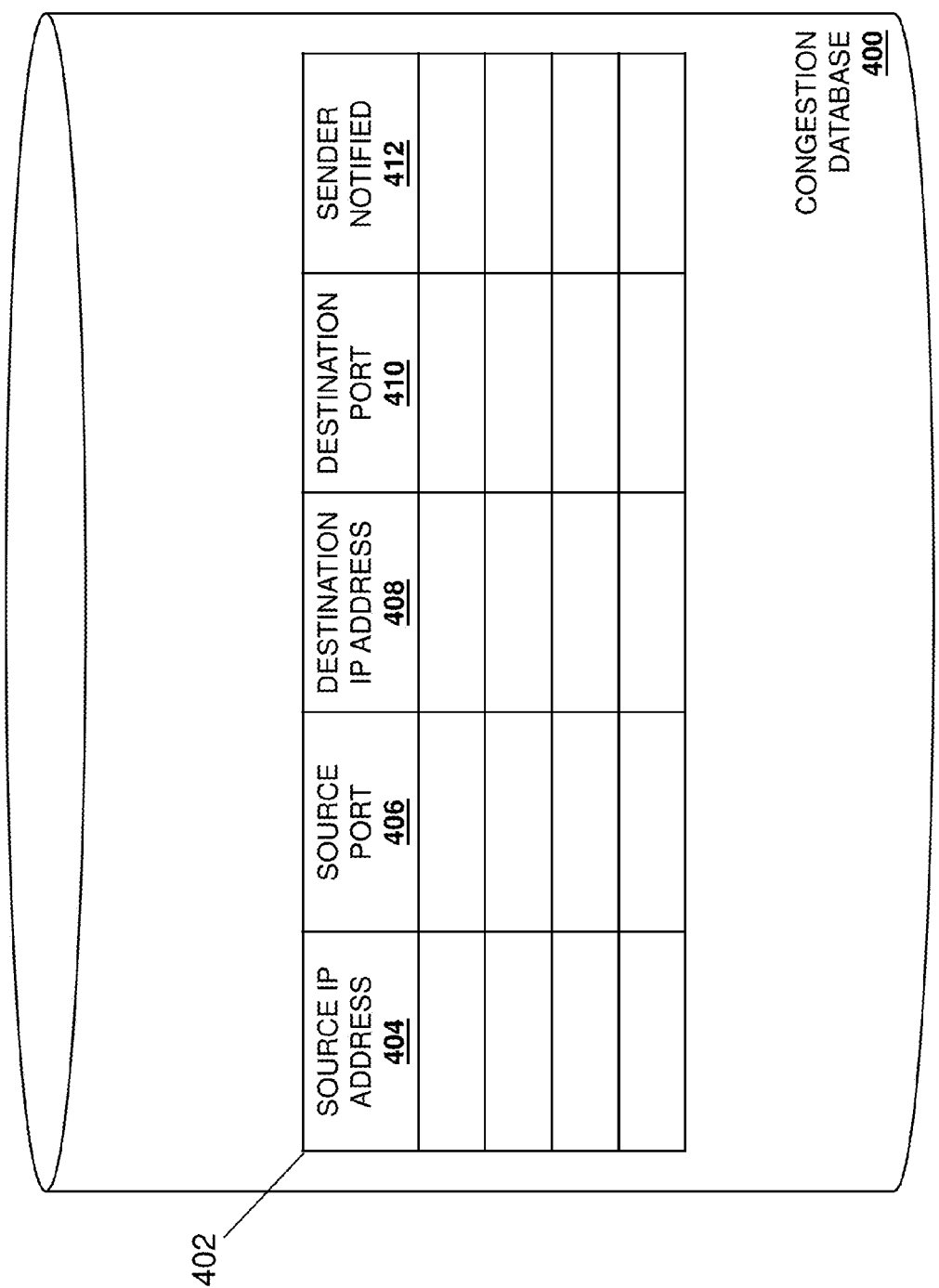
FIG. 4 is a schematic view illustrating an embodiment of a congestion database used with the networking device of FIG. 3.

Referring now to FIG. 4, an embodiment of a congestion database 400 is illustrated. In an embodiment, the congestion database 400 may be the congestion database 308 discussed above with reference to FIG. 3, and as described above may be provided on a storage system. In the illustrated embodiment, the congestion database 400 includes a congestion table 402 having columns that provide a source Internet Protocol (IP) address field 404, a source port field 406, a destination IP address field 408, a destination port field 410, and a sender notified field 412 for any of a plurality of rows in the congestion table 402. As discussed in further detail below, each row in the congestion table 402 of the congestion database 308/400 may be populated with information retrieved from or associated with congestion-notification-capable data packets that are received by a networking device that is experiencing a congestion situation.

For example, using the congestion notification system 200 discussed above with reference to FIG. 2, the source IP address field 404a for a particular row in the congestion table 402 may include the IP address of the sender device 202 that is retrieved from a packet received at a networking device from the sender device 202, the source port field 406 may include an identifier for a port (e.g., a layer 4 (L4) port) on the sender device 202 that is retrieved from a packet received at the networking device from the sender device 202, the destination IP address field 408 may include the IP address of the receiver device 204 that is retrieved from a packet received at the networking device from the sender device 202 and destined for the receiver device 204, the destination port field 41 may include an identifier for a port (e.g., an L4 port) on the receiver device 204 that is retrieved from a packet received at the networking device from the sender device 202 and destined for the receiver device 204. As discussed in further detail below, the sender notified field 412 for any particular row in the congestion table 402 may be set and unset in order to assure that the state of congestion situation is not over-estimated in sender devices that utilize data transfer protocols that deal with congestion based on the number of congestion notifications received.

One of skill in the art in possession of the present disclosure will recognize that the congestion table 402 may be modified depending on the characteristics of the congestion notification system in which it is implemented. For example, in relatively simple embodiments of the congestion notification system 200, the destination IP address field 408, the destination port field 410, and the sender notified field 412 may be omitted such that only the source IP address field 404 and source port field 406 are provided for each row. Similarly, in embodiments of the congestion notification system 200 that include sender devices that utilize data transfer protocols that, for example, only consider a single congestion notification that is received (and disregard subsequent congestion notifications) as discussed in further detail below, the sender notified field 412 may be omitted. Furthermore, in some embodiments, fields may be added that identify, for example, the protocol being used to transfer the packet (e.g., IP, Transmission Control Protocol (TCP), User Datagram Protocol (UDP), etc.) and/or a variety of other information that may be retrieved from or associated with a received packet. As such, a wide variety of information other than that which is illustrated may be retrieved from a received packet and included in a row of the congestion table 402 while remaining within the scope of the present disclosure.

Figure 5:
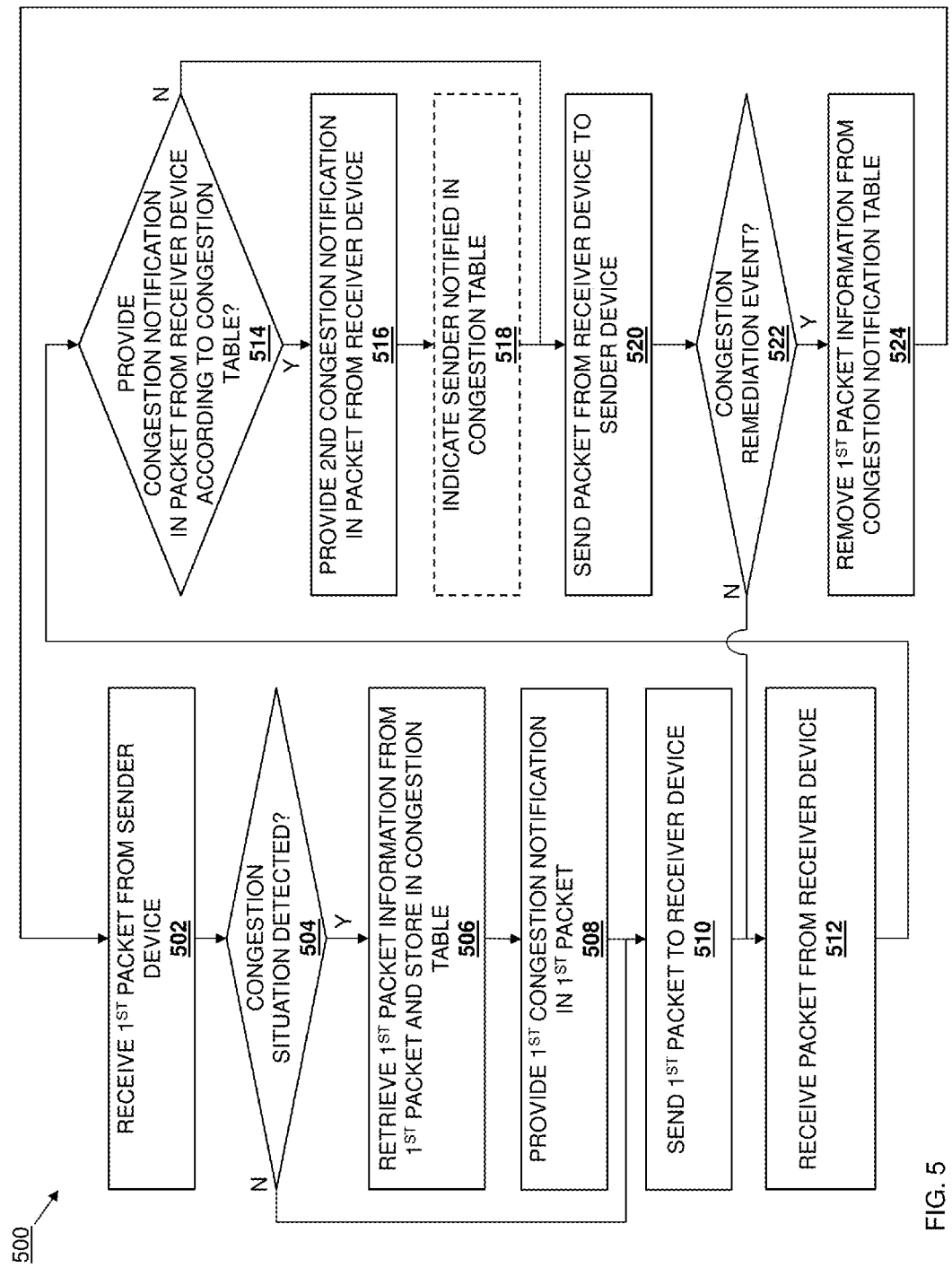
FIG. 5 is a flow chart illustrating an embodiment of a method for congestion notification.

Referring now to FIG. 5, an embodiment of a method 500 for congestion notification is illustrated. As discussed in further detail below, the method 500 provides for the notification of a sender device about a congestion situation earlier than is possible in conventional systems by having a networking device store first packet information retrieved from first packets that are received from the sender device when a congestion situation is detected, and provide a congestion notification in a packet that is received from a receiver device and that include the first packet information. This allows congestion notifications to be provided in a packet that was sent by the receiver device before that receiver device received the first packet, and thus results in the senders device being informed of the congestion situation earlier than in conventional systems. As such, the sender device may attempt to remediate the congestion situation by performing actions such as data transmission window size reduction and packet transmission rate reduction earlier than is possible in conventional systems, thus reducing the data loss associated with congestion in such conventional systems. The embodiment of the method 500 is discussed below with reference to FIGS. 6a-6f, which provide an example of the congestion notification system 200 of FIG. 2, including the sender device 202 coupled to the receiver device 204 by the plurality of networking devices 206a-c, and the networking device 206b performing the method 500. However, one of skill in the art in possession of the present disclosure will a wide variety of modification to that embodiment (different configuration of the congestion notification system 200, other networking device(s) performing the method 500, etc.) will fall within the scope of the present disclosure.

Figure 6A:
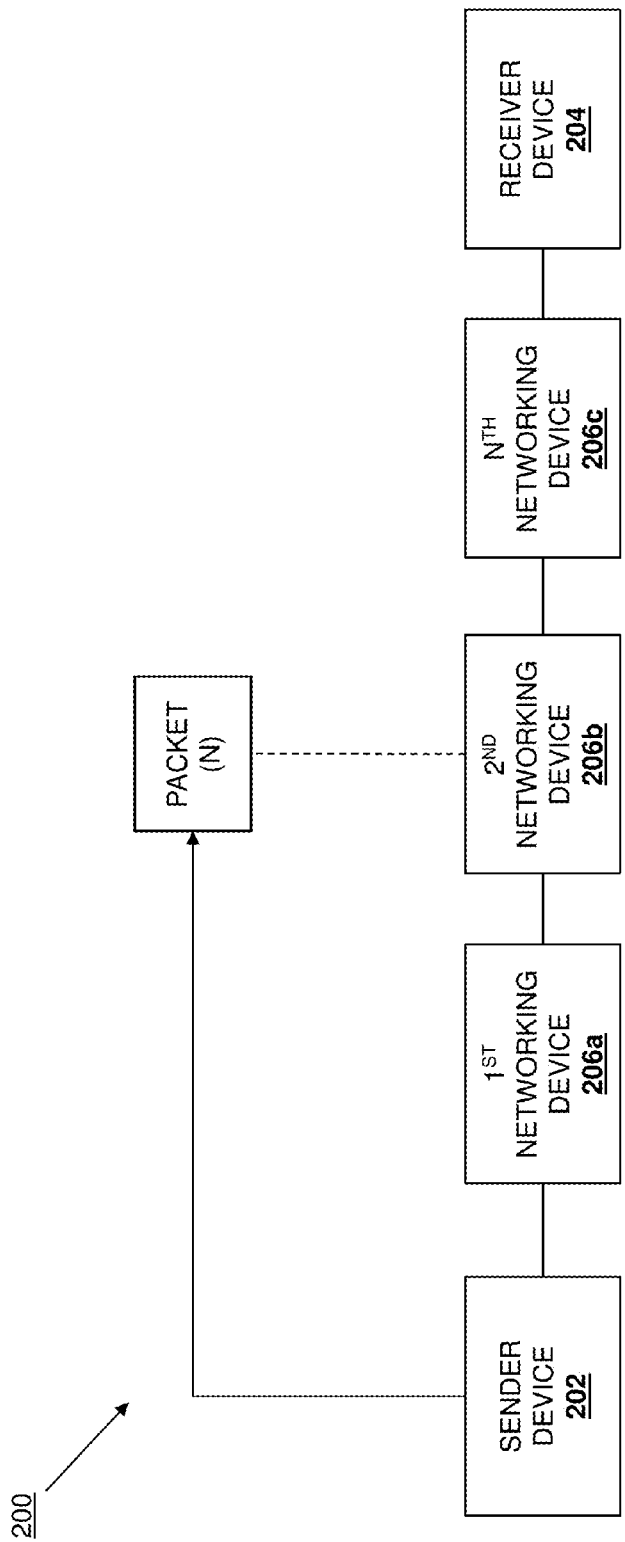
FIG. 6a is a schematic view illustrating an embodiment of the congestion notification system of FIG. 2 operating according to the method of FIG. 5.

With reference to FIG. 6a, the method 500 begins at block 502 where a first packet is received from a sender device. In an embodiment, the sender device 202 creates and sends a packet (hereinafter a "first packet (N)") through the first networking device 206 that is received at the second networking device 206b. In one or more embodiments, the first packet (N) may be a Transmission Control Protocol (TCP) packet, a congestion-notification-enabled User Datagram Protocol (UDP) packet (which is not currently provided per UDP, but which would fall within the scope of the present disclosure if such an enhancement were provided), a congestion-notification-capable packet (e.g., an explicit congestion notification (ECN)-capable transport packet), and/or may include a variety of other packet characteristics known in the art. In the examples illustrated and described with reference to the method 500, the first packet (N) sent by the sender device 202 and received at the second networking device 206b is designated the "(N)" to indicate a sequence, timing, or other temporal characteristic of that packet relative to other packets. As such, the second packet (N–X) discussed below indicates a packet earlier in sequence, time, or other temporal characteristic relative to the first packet (N), and the third packet (N+X) discussed below indicates a packet later in sequence, time, or other temporal characteristic relative to the packet (N), as is discussed in further detail below. For example, the designation "first packet (N)" may refer to a reference packet with a particular sequence number and corresponding acknowledgement number (e.g., 100), the designation "second packet (N–X)" may refer to an earlier packet (relative to the reference packet) with an earlier sequence number and corresponding acknowledgement number (e.g., 90), and the designation "third packet (N+X)" may refer to a later packet (relative to the reference packet) with a later sequence number and corresponding acknowledgement number (e.g., 110). At block 502, the packet (N) may be received by the congestion notification engine 306 in the second networking device 206b/300 through the communication system 304.

The method 500 the proceeds to decision block 504 where it is determined whether congestion situation is detected. In an embodiment, the congestion notification engine 306 and/or a congestion detection subsystem in the second networking device 206b/300 may operate to determine whether a congestion situation exists in and/or associated with the second networking device 206b/300. In one or more embodiments, a congestion situation may be detected in response to determining a variety of congestion situation characteristics known in the art that indicate that the rate of reception of packets at a network device being greater than the rate at which that network device can forward the packets. For example, a plurality of first packets may be received at a network device at a rate of 500 Mbps, and a plurality of second packets may be received at that network device at a rate of 600 Mbps at the same time. If those first packets and second packets must be forwarded through a common port on the network device with a 1 Gbps capacity (less than the 1.1 Gbps rate at which they're being received), the network device must buffer or store at least some of the first packets or second packets in queue buffers, and the buffering or storage of packets in such queue buffers may be a congestion situation characteristic that is determined at decision block 504, although other congestion situation characteristics will fall within the scope of the present disclosure. While the method 500 is illustrated and discussed herein as determining whether the congestion situation is detected subsequent to receiving the first packet (N) from the sender device 202, the congestion situation may be detected prior to the receiving the first packet (N) from the sender device 202 while remaining within the scope of the present disclosure. If, at decision block 504, it is determined that no congestion situation is detected, the method 500 proceeds to block 510 where the first packet (N) is sent to the receiver device 204, discussed in further detail below.

Figure 6B:
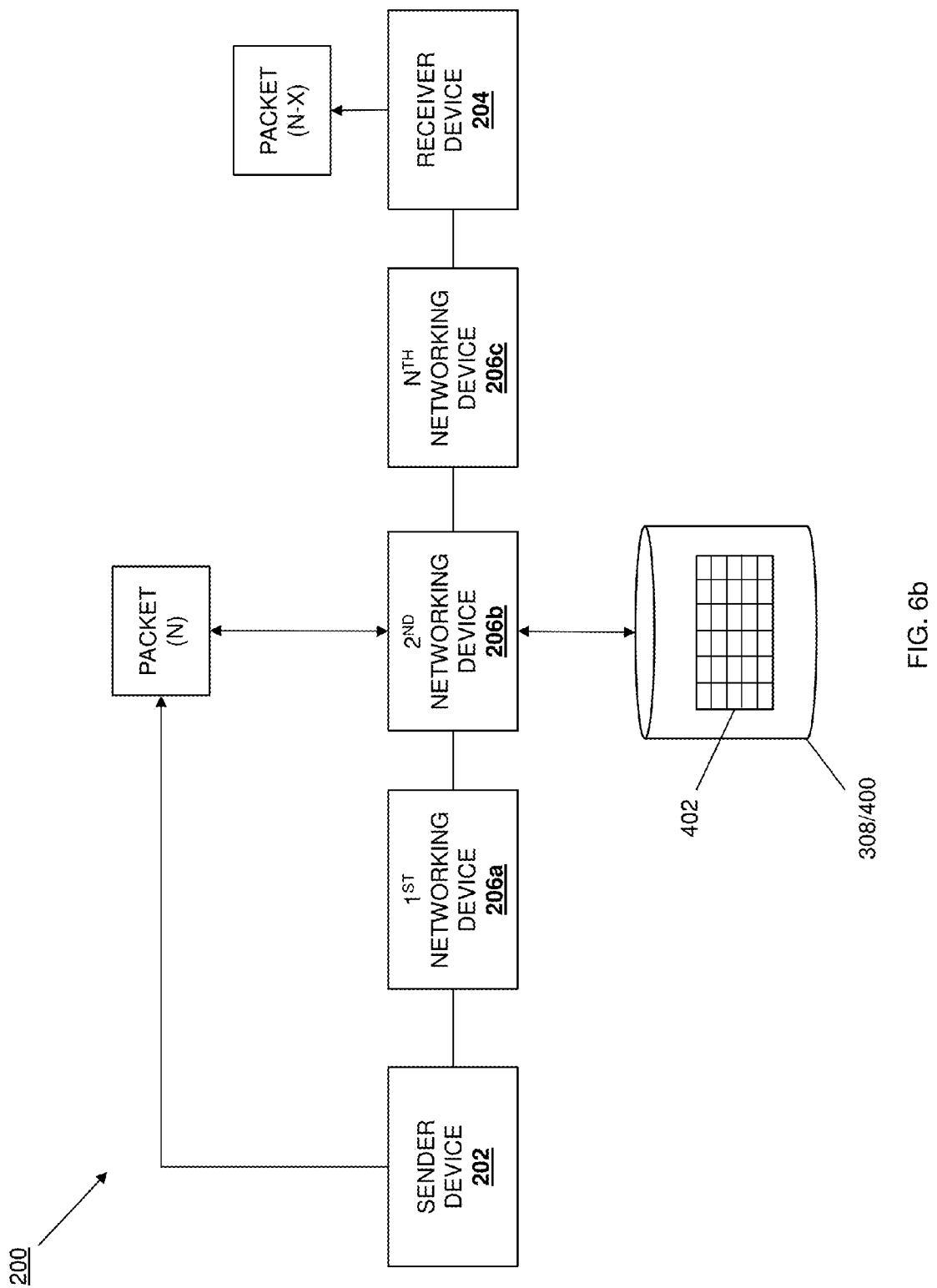
FIG. 6b is a schematic view illustrating an embodiment of the congestion notification system of FIG. 2 operating according to the method of FIG. 5.

With reference to FIG. 6b, if at decision block 504 it is determined that a congestion situation is detected, the method 500 proceeds to block 506 where first packet information is retrieved from the first packet and stored in a congestion table. In an embodiment, block 506 may be performed when the congestion situation has been detected and the first packet (N) received from the sender device 202 is a congestion-notification-capable packet such as the ECN-capable transport packet discussed above. In one example, at block 506 the congestion notification engine 306 in the second networking device 206b/300 may retrieve (e.g., from a packet header) a sender IP address of the sender device 202 and a sender device port identifier of a port (e.g., an L4 port) on the sender device 202 from which the packet (N) was sent, store the sender IP address of the sender device 202 in the source IP address field 404 of a first row of the congestion table 402 in the congestion database 400, and store the sender device port identifier of the port on the sender device 202 from which the packet (N) was sent in the source port field 406 of the first row of the congestion table 402 in the congestion database 400.

In addition, in some examples, at block 506 the congestion notification engine 306 in the second networking device 206b/300 may retrieve (e.g., from a packet header) a receiver IP address of the receiver device 204 and a receiver device port identifier of a port (e.g., an L4 port) on the receiver device 204 to which the packet (N) is being sent, store the receiver IP address of the receiver device 204 in the destination IP address field 408 of the first row of the congestion table 402 in the congestion database 400, and store the receiver device port identifier of the port on the receiver device 204 to which the packet (N) is being sent in the destination port field 410 of the first row of the congestion table 402 in the congestion database 400. As such, each of the first packet information retrieved from the first packet (N) may be stored in association with each other (e.g., in a common row) in the congestion table 402. One of skill in the art in possession of the present disclosure will recognize that the retrieval and storage of information about the receiver device 204 may be beneficial in congestion notification systems in which different receiver/destination devices send packets to the sender device 202 along different data paths, not all of which may be subject to congestion situations at a given time. As discussed above, the congestion table 402 in the congestion database 400 may be configured to store other first packet information included in the first packet (N), such as the protocol being used to transfer the first packet (N) and/or other packet information known in the art, and thus the retrieval and storage of that packet information from the first packet (N) at block 506 is envisioned as falling in within the scope of the present disclosure.

Again with reference to FIG. 6b, the method 500 then proceeds to block 508 where a first congestion notification is provided in the first packet. While block 508 is illustrated and described as being performed following block 506, block 508 may be performed before or at the same time as block 506 while remaining within the scope of the present disclosure. In an embodiment, block 508 may be performed when the first packet (N) received from the sender device 202 is a congestion-notification-capable packet such as the ECN-capable transport packet discussed above. In an embodiment, the congestion engine 308 in the second networking device 206b/300 may provide the first congestion notification in the first packet (N). For example, the congestion engine 308 may provide the first congestion notification by setting a congestion-encountered (CE) bit in the IP header of the first packet (N). However, a variety of other congestion notifications may be provided in the first packet (N) while remaining within the scope of the present disclosure.

With reference to FIG. 6c, following the provision of the first congestion notification in the first packet (N) or the determination that a congestion situation is not detected at decision block 504, the method 500 proceeds to block 510 where the first packet is sent to a receiver device. In an embodiment, the congestion notification engine 306 in the second networking device 206b uses the communication system 304 to send the first packet (N) through the $N^{th}$ networking device 206c to the receiver device 204. It should be understood that, subsequent to receiving the first packet (N) including the first congestion notification provided at block 508, the receiver device 204 will begin providing the congestion notifications (e.g., the second congestion notifications discussed below that may be provided, for example, by setting an ECN echo bit) in subsequent packets (e.g., TCP ACKs) sent back to the sender device 202.

With reference to FIGS. 6b and 6c, the method 500 then proceeds to block 512 where a packet is received from the receiver device. In one or more embodiments, the second packet (N−X) may be a Transmission Control Protocol (TCP) acknowledgement (ACK) packet, a User Datagram Protocol (UDP) acknowledgement (ACK) packet associated the possible future congestion-notification-enabled UDP packets discussed above, a congestion-notification-capable packet (e.g., an ECN-capable transport packet), and/or may include a variety of other packet characteristics known in the art. As can be seen in FIGS. 6b and 6c, a packet (hereinafter a "second packet (N−X)") is created and sent by the receiver device 204 prior to the receiver device 204 receiving the first packet (N) that is sent by the sender device 202 to the second networking device 206b, and forwarded by the second networking device 206b to the receiver device 204. As discussed above, the designation of the second packet (N−X) is intended to convey that the second packet (N−X) is earlier in sequence, time, or other temporal characteristic relative to the packet (N). In different embodiments, the second packet (N−X) is earlier in sequence, time, or other temporal characteristic relative to the first packet (N) by being received by the second networking device 206b subsequent to the second networking device 206b storing the first packet information about the first packet (N) in the congestion database 400, and sent by the receiver device 204 prior to the receiver device 204 receiving the first packet (N) from the second networking device 206b. For example, the receiver device 204 may send the second packet (N-X) in response to an earlier received packet from the sender device 202 (i.e., sent before the first packet (N)). At block 512, the second packet (N-X) that was sent by the receiver device 204 is transmitted through the $N^{th}$ networking device 206c and received through the communication system 304 by the congestion notification engine 306 in the second networking device 206b/300.

With reference to FIG. 6c, the method 500 then proceeds to decision block 514 where it is determined whether, according to the congestion table, a congestion notification should be provided in the packet that was received from the receiver device. In an embodiment, the congestion notification engine 306 in the second networking device 206b/300 retrieves second packet information from the second packet (N-X) and compares that second packet information to information stored in the congestion table 402 of the congestion database 308/400. In one example, at decision block 514 the congestion notification engine 306 may retrieve (e.g., from a packet header) a destination IP address and a destination port identifier from the second packet (N-X) and determine whether that destination IP address and destination port identifier match the source IP address field 404 and the source port field 406 in any row of the congestion table 402 in the congestion database 400. Using the example of the first packet (N) discussed above that caused the sender IP address of the sender device 202 and the sender device port identifier of the port on the sender device 202 to be stored in the source IP address field 404 and the source port field 406 of the first row of the congestion table 402 at block 506, at decision block 514 the congestion notification engine 306 may determine that the destination IP address and destination port identifier from the second packet (N-X) match that information in the source IP address field 404 and the source port field 406, respectively, of the first row of the congestion table 402, and in response, the method 500 will proceed to block 516.

In addition, in some examples, at decision block 514 the congestion notification engine 306 in the second networking device 206b/300 may retrieve (e.g., from a packet header) a source IP address and a source port identifier from the second packet (N-X) and determine whether that source IP address and source port identifier match a destination IP address field 408 and a destination port field 410 in any row of the congestion table 402 in the congestion database 400. Using the example of the first packet (N) discussed above that caused the sender IP address of the sender device 202, the sender device port identifier of the port on the sender device 202, the receiver IP address of the receiver device 204, and the receiver device port identifier of the port on the receiver device 202 to be stored in the source IP address field 404, the source port field 406, the destination IP address field 408, and the destination port field 410 of the first row of the congestion table 402 at block 506, at decision block 514 the congestion notification engine 306 may determine that the destination IP address, destination port identifier, source IP address, and source port identifier from the second packet (N-X) match that information in the source IP address field 404, the source port field 406, the destination IP address field 408, and the destination port field 410, respectively, of the first row of the congestion table 402, and in response, the method 500 will proceed to block 516.

As discussed above, the congestion table 402 in the congestion database 400 may be configured to store other first packet information included in the first packet (N), such as the protocol used to transfer the first packet (N) and/or other packet information known in the art, and thus the retrieval of similar packet information from the second packet (N-X) and comparison to information stored in the congestion table 402 at block 514 is envisioned as falling in within the scope of the present disclosure. The current example of the method 500 provides a situation where the second packet (N-X) is the first received following the storage of the first packet information from the first packet (N) in the congestion table 402. As such, in embodiments of the method 500 that utilize the sender notified field 412 in the congestion table 402, the sender notified field 412 associated with the first packet information (in the first row of the congestion table 402 using the example provided above) is unset in in the current example of the decision block 514. However, the setting and unsetting of the sender notified field 412 is discussed in further detail below. If, at decision block 514 it is determined that, according to the congestion table 402, a congestion notification should not be provided in the packet that was received from the receiver device (e.g., the second packet information does not match information in any row of the congestion table 402), the method 500 proceeds to block 520 where the packet that was received from the receiver device is sent to the sender device, discussed in further detail below.

If, at decision block 514, it is determined that, according to the congestion table, a congestion notification should be provided in the packet that was received from the receiver device (e.g., the second packet information matches information in a row of the congestion table, as discussed above), the method 500 proceeds to block 516 where a second congestion notification is provided in the packet that was received from the receiver device. In an embodiment, block 516 may be performed when the second packet (N-X) received from the sender device 202 is a congestion-notification-capable packet such as the ECN-capable transport packet discussed above. In an embodiment, the congestion notification engine 306 in the second networking device 206b/300 may provide the second congestion notification in the second packet (N-X). For example, the congestion engine 308 may provide the second congestion notification by setting an ECN echo flag in a TCP ACK packet (the second packet (N-X)) received from the receiver device 204. However, a variety of other congestion notifications may be provided in the second packet (N-X) while remaining within the scope of the present disclosure. In response to providing the second congestion notification in the second packet (N-X), the congestion notification engine 306 may recalculate a initial checksum that was received in the second packet (N-X) and replace that initial checksum with the recalculated checksum.

The method 500 may then proceed to optional block 518 where it is indicated in the congestion table that the sender has been notified. As discussed above, the sender notified field 412 may be provided in the congestion table 402 in some embodiments of the systems and methods of the present disclosure in order to assure that the state of congestion situation is not over-estimated when the sender device utilizes a data transfer protocol that deals with congestion based on the number of congestion notifications received. For example, in conventional congestion notification systems using the Data Center Transmission Control Protocol (DCTCP), ECN is used to estimate the extent of the congestion at the sender device, and the sending rate is reduced to the extent of the congestion. This is accomplished in such conventional congestion notification systems by having the sender device calculate a number of TCP ACKs that are received and that have an ECN echo flag set (i.e., sent by the receiver device in response to receiving a packet with a CE bit that was set by the networking device in the conventional congestion notification system), and then reducing the data transmission window size accordingly (i.e., relatively larger data transmission window size reductions in response to receiving relatively more TCP ACKs including set ECN echo flags, relatively smaller data transmission window size reductions in response to receiving relatively fewer TCP ACKs including set ECN echo flags).

At optional block 518, the congestion notification engine 306 in the second networking device 206b/300 may set, mark, or otherwise provide a sender notification indicator in the sender notified field 412 of the row of the congestion notification table 402 that includes the information matching the information in the second packet (N–X) that caused the second congestion notification to be provided in the second packet (N–X). For example, using the example above where the information in the second packet (N–X) matched the first packet information from the first packet (N) that was stored in the first row of the congestion notification table 402 (and because of which the second congestion notification was provided in the second packet (N–X) at block 516), at optional block 518 the congestion notification engine 306 may set the sender notified field 412 in that first row of the congestion table 402. As discussed below, following the setting of the sender notified field 412 in a row of the congestion table 402 in embodiments of the method that include optional block 518, further packets received by the networking device 206b/300 from the receiver device 204 that are determined to include information that matches the source IP address field 404 and the source port field 406 (and in some embodiments, the destination IP address field 408 and the destination port field 410) in a that row of the congestion table 402 will not have a second congestion notification provided in them by the networking device 206b/300, which prevents the sender device 202 from overestimating the congestion situation. However, in conventional congestion notification systems that operate according to RFC 3168, sender devices are configured to react to congestion at most once per window of data (i.e., at most once per round-trip time), which avoids reacting multiple times to multiple indications of congestion within a round-trip time. As such, in such conventional congestion notification systems, optional block 518 may be skipped.

Figure 6D:
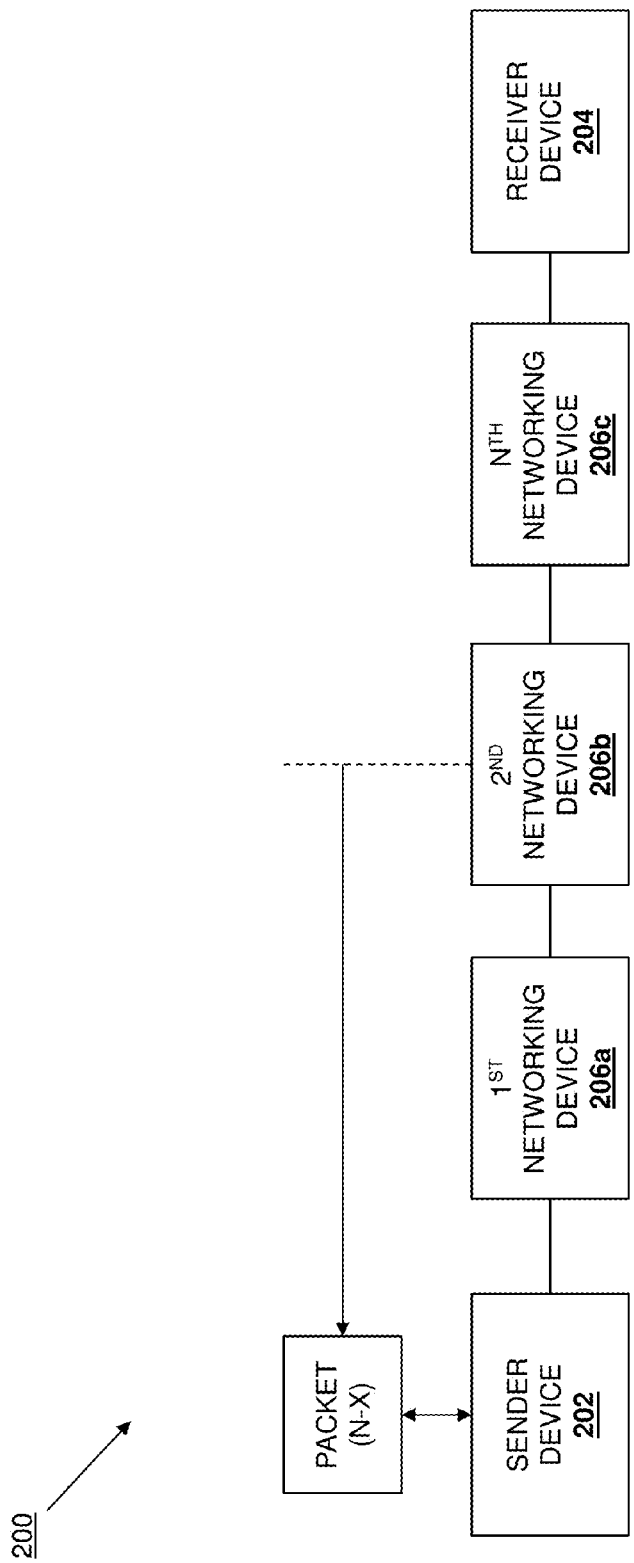
FIG. 6d is a schematic view illustrating an embodiment of the congestion notification system of FIG. 2 operating according to the method of FIG. 5.
Figure 6F:
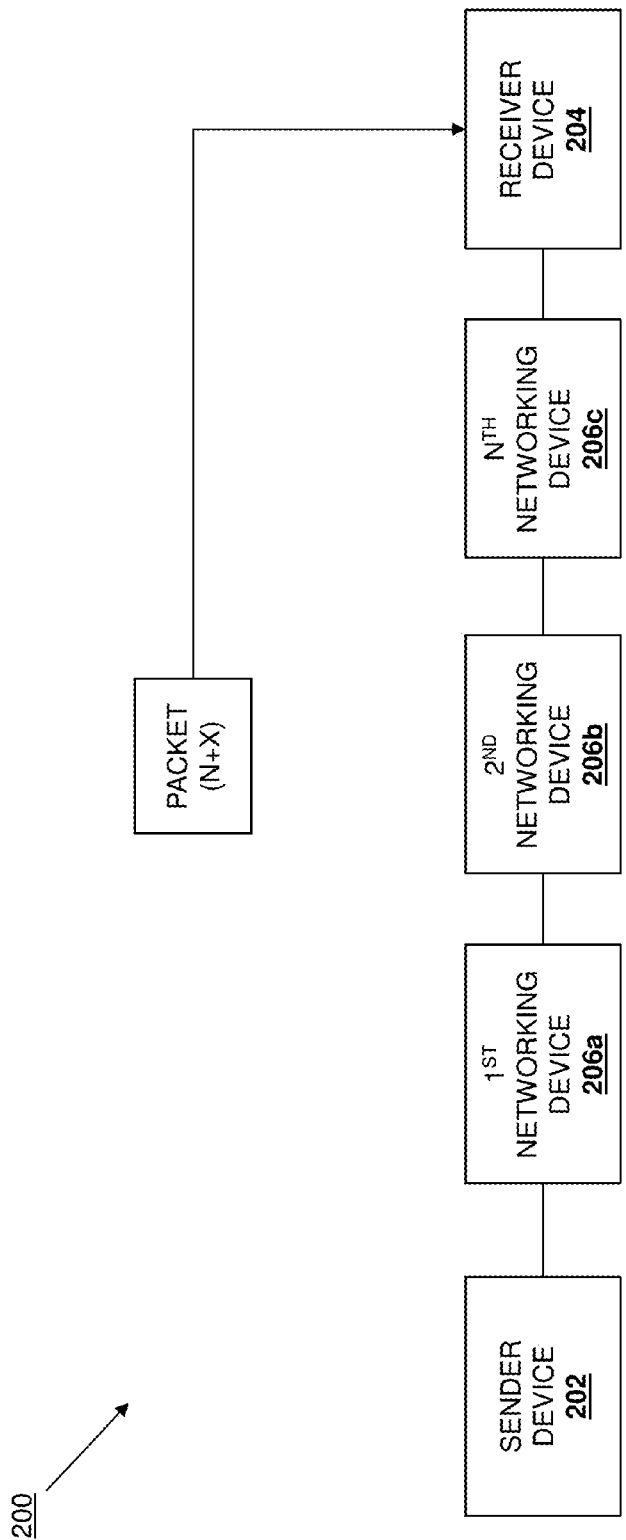
FIG. 6f is a schematic view illustrating an embodiment of the congestion notification system of FIG. 2 operating according to the method of FIG. 5.

With reference to FIG. 6d, following block 516, optional block 518, or decision block 514 (i.e., in response to determining that, according to the congestion table 402, no congestion notification should be provided in the packet received from the receiver device 204), the method 500 proceeds to block 520 where the packet from the receiver device is sent to the sender device. In an embodiment, the congestion notification engine 306 in the second networking device 206b/300 sends the second packet (N–X) through the first networking device 206a to the sender device 202. In response to receiving the second packet (N–X) with the second congestion notification, the sender device 202 will operate to perform congestion remediation actions. For example, in response to receiving the TCP ACK (i.e., the second packet (N–X)) that was sent from the receiver device 204 and that includes the ECN echo flag set by the second networking device 206b, the sender device 202 may operate to reduce its data transmission window size (e.g., the maximum amount of data that the sender device 202 will include in a packet it sends to the receiver device 204), reduce its packet transmission rate (e.g., the rate at which the sender device 202 will send packets to the receiver device 204), and/or perform a variety of other congestion remediation actions known in the art.

With reference to FIG. 6e, the method 500 then proceeds to decision block 522 where it is determined whether a congestion remediation event has occurred. As discussed above, in response to receiving the second packet (N–X) with the second congestion notification, the sender device 202 performs a congestion remediation action. Following the performance of the congestion remediation action, the sender device 202 may create a packet (hereinafter a "third packet (N+X)") and provide a congestion remediation message in that third packet (N+X). In one or more embodiments, the third packet (N–X) may be a TCP packet, a UDP packet, a congestion-notification-capable packet (e.g., an ECN-capable transport packet), and/or may include a variety of other packet characteristics known in the art. As discussed above, the designation of the third packet (N+X) is intended to convey that the third packet (N+X) is later in sequence, time, or other temporal characteristic relative to the first packet (N). As such, the sender device 202 may create and send the third packet (N+X) after creating and sending the first packet (N) and receiving the second packet (N–X). In a specific example of block 522, the sender device 202 may create the third packet (N+X) and provide the congestion remediation message by setting a congestion window reduced (CWR) bit in the TCP header of the third packet (N+X). The sender device 202 then sends the third packet (N+X) through the first networking device 206a such that the third packet (N+X) is received by the second networking device 206b.

At block 522, the congestion notification engine 306 in the second networking device 206b/300 may receive a packet from the sender device 202 and determine whether a congestion remediation event has occurred by determining whether a congestion mediation message is provided in that packet. For example, at decision block 522, the congestion notification engine 306 determines whether a CWR bit has been set in the third packet (N+X) received from the sender device 202. However, in other embodiments, the congestion notification may determine whether a congestion remediation event has occurred by determining whether a predetermined time period has passed since the second congestion notification was provided in the second packet (N–X) and/or that second packet (N–X) was sent to the sender device 202. If, at decision block 522, it is determined that no congestion remediation event has occurred (i.e., no packet has been received with a congestion remediation message, a predetermined time period has not passed since the provisioning of the second congestion notification and/or sending the associated packet, and/or a variety of other congestion remediation events known in the art), the method 500 returns to block 512 where packets are received from the receiver device 204.

If, at decision block 522, it is determined that a congestion remediation event has occurred (i.e., a packet has been received with a congestion remediation message, a predetermined time period has passed since the provisioning of the second congestion notification and/or sending the associated packet, and/or a variety of other congestion remediation events known in the art), the method 500 proceeds to block 524 where the first packet information is removed from the congestion notification table. In an embodiment, at block 524 the congestion notification engine 306 in the second networking device 206b/300 may remove the first packet information stored in the congestion database 400 at block 506 from the congestion table 402. Using the example provided above, upon receiving the third packet (N+X) that has the CWR bit set, the congestion notification engine 306 may remove the IP address of the sender device 202 and the identifier of the port on the sender device 202 (and in some embodiment the IP address of the receiver device 204 and the identifier of the port on the receiver device 204) from the first row of the congestion table 402. The method 500 then returns to block 502.

While the method 500 is illustrated and described as returning to block 512 to receive packets from the receiver device 204 when no congestion remediation event is determined at decision block 522, the second networking device 206b/300 may continue to receive packets from the sender device 202 and forward those packets to the receiver device 204 as well. In such situations where the packets from the sender device 202 to the receiver device 204 have their information already stored in the congestion table 402 and congestion situation still exists, the second networking device 206b/300 may provide the first congestion notifications (e.g., by setting the CE bit) in those packets and forward them to the receiver device 204. It should be understood that when the congestion situation is no longer present at or associated with the second networking device 206b/300, the congestion notification engine 306 will stop providing the first congestion notifications in packets forwarded to the receiver device 204 (e.g., by setting the CE bit) and/or the second congestion notifications in the packets forwarded to the sender device 202 (e.g., by including the ECN echo flag), which will result in the sender device receiving packets from the receiver device 204 (e.g., TCP ACKs) that do not indicate congestion and result in the sender device increasing the data transmission window size and packet transmission rates.

Returning now to the embodiment above where no congestion remediation event was determined at decision block 522 and the method 500 returned to block 512 where packets are received from the receiver device 204, the example of the use of the sender notified field 412 in the congestion table 402 is continued. Upon the second networking device 206b-300 receiving another packet (hereinafter a "fourth packet") from the receiver device 204 that includes information that matches the first packet information that was stored in the congestion table 402 as described above, the method 500 proceeds to decision block 514. In this example, the second networking device 206b-300 may operate substantially as discussed above at decision block 514. However, in embodiments that include optional block 518, the congestion notification engine 306 in the second networking device 206b-300 will determine that while the information in the fourth packet matches the first packet information in the first row of the congestion table 402, a congestion notification should not be provided in the fourth packet according to the congestion table 402 due to the sender notified field associated with the first packet information being set, and the method 500 will proceed to block 520.

As such, in such embodiments, the networking device 206b/300 may provide the early congestion notification (i.e., the second congestion notification provided in the second packet (N-X) to the sender device 202) in the first packet that is received from the receiver device 204 that matches information provided in the congestion table 402 at block 506, and then the networking device 206b/300 will not provide congestion notification in subsequent packets from the receiver device 204. This prevents sender devices, which are configured to use protocols such as the Data Center Transmission Control Protocol (DCTCP) to estimate the extent of the congestion and reduce the sending rate based on that estimate, from overestimating the congestion due to extra congestion notifications that would be provided by the second networking device 206b/300 if the sender notified field were not set. As discussed above, subsequent to receiving the first packet (N) including the first congestion notification provided at block 508, the receiver device 204 will begin providing the second congestion notification (e.g., by setting the ECN echo bit) in any subsequent packets (e.g., TCP ACKs) sent back to the sender device 202, which will allow the sender device 202 to accurately estimate the extend of the congestion to reduce the sending rate as discussed above.

Thus, systems and methods have been described that provide for the early notification to sender devices about congestion situations by having networking devices store information retrieved from first packets that are received from the sender devices when a congestion situation is detected, and provide congestion notifications in packets that are sent by receiver devices to those sender devices prior to receiving those first packets and that include information that matches those first packets. This allows the sender devices to be informed of the congestion situations earlier than in conventional systems, and to remediate the congestion situation earlier than is possible in conventional systems, thus reducing the data loss associated with congestion in such conventional system. As such, in some embodiment, an enhanced ECN-based congestion notification system has been described that provides these substantial benefits over conventional ECN-based congestion notification systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A congestion notification system, comprising:
a sender device;
a receiver device;
a networking device coupled between the sender device and the receiver device, wherein the networking device is configured to:
detect a congestion situation;
receive a first packet from the sender device and, in response to detecting the congestion situation, provide a first congestion notification in the first packet, retrieve sender device information that is included in the first packet and store the sender device information in a database, and send the first packet to the receiver device;
receive a second packet from the receiver device that was sent by the receiver device prior to the receiver device receiving the first packet;
determine that the second packet includes the sender device information that is stored in the database and, in response, provide a second congestion notification in the second packet; and
send the second packet to the sender device.
2. The congestion notification system of claim 1, wherein the networking device is configured to:

retrieve receiver device information that is included in the first packet and store the receiver device information in association with the sender device information in the database, wherein second congestion notification is provided in the second packet in response to determining that the second packet includes the sender device information and the receiver device information that is stored in the database.

3. The congestion notification system of claim 1, wherein the networking device is configured to:
receive a third packet that includes a congestion remediation message from the sender device and, in response, remove the sender device information from the database.

4. The congestion notification system of claim 1, wherein the networking device is configured to:
associate a sender notification indicator with the sender device information in the database in response to providing the second congestion notification in the second packet; and
receive a third packet that includes the sender device information that is stored in the database and not provide a congestion notification in the third packet in response to the sender notification indicator being associated with the sender device information in the database.

5. The congestion notification system of claim 1, wherein the second packet includes a first checksum, and wherein the networking device is configured to:
calculate a second checksum for the second packet in response to providing the second congestion notification in the second packet; and
replacing the first checksum in the second packet with the second checksum.

6. The congestion notification system of claim 1, wherein the networking device is configured to:
remove the sender device information from the database in response to determining that a predetermined time period has passed.

7. The congestion notification system of claim 1, wherein the receiver device is configured to:
provide the second congestion notification in a third packet that is sent to the sender device in response to receiving the first packet with the first congestion notification from the networking device.

8. An information handling system (IHS), comprising:
a processing system; and
a memory system that includes instructions that, when executed by the processing system, cause the processing system to provide a congestion notification engine that is configured to:
detect a congestion situation;
receive a first packet from a sender device and, in response to detecting the congestion situation, provide a first congestion notification in the first packet, retrieve sender device information that is included in the first packet and store the sender device information in a database, and send the first packet to a receiver device;
receive a second packet from the receiver device that was sent by the receiver device prior to the receiver device receiving the first packet;
determine that the second packet includes the sender device information that is stored in the database and, in response, provide a second congestion notification in the second packet; and
send the second packet to the sender device.

9. The IHS of claim 8, wherein the congestion notification engine is configured to:
retrieve receiver device information that is included in the first packet and store the receiver device information in association with the sender device information in the database, wherein second congestion notification is provided in the second packet in response to determining that the second packet includes the sender device information and the receiver device information that is stored in the database.

10. The IHS of claim 8, wherein the congestion notification engine is configured to:
receive a third packet that includes a congestion remediation message from the sender device and, in response, remove the sender device information from the database.

11. The IHS of claim 8, wherein the congestion notification engine is configured to:
associate a sender notification indicator with the sender device information in the database in response to providing the second congestion notification in the second packet; and
receive a third packet that includes the sender device information that is stored in the database and not provide a congestion notification in the third packet in response to the sender notification indicator being associated with the sender device information in the database.

12. The IHS of claim 8, wherein the congestion notification engine is configured to:
calculate a second checksum for the second packet in response to providing the second congestion notification in the second packet; and
replace a first checksum in the second packet with the second checksum.

13. The IHS of claim 8, wherein the congestion notification engine is configured to:
remove the sender device information from the database in response to determining that a predetermined time period has passed.

14. A method for congestion notification, comprising:
detecting, by a networking device, a congestion situation;
receiving, by the networking device from a sender device, a first packet and, in response to detecting the congestion situation, providing a first congestion notification in the first packet, retrieving sender device information that is included in the first packet and storing the sender device information in a database, and sending the first packet to a receiver device;
receiving, by the networking device from the receiver device, a second packet that was sent by the receiver device prior to the receiver device receiving the first packet;
determining, by the networking device, that the second packet includes the sender device information that is stored in the database and, in response, providing a second congestion notification in the second packet; and
sending, by the networking device to the sender device, the second packet.

15. The method of claim 14, further comprising:
retrieving, by the networking device, receiver device information that is included in the first packet and storing the receiver device information in association with the sender device information in the database, wherein second congestion notification is provided in the second packet in response to determining that the second packet includes the sender device information and the receiver device information that is stored in the database.

16. The method of claim 14, further comprising:
receiving, by the networking device from the sender device, a third packet that includes a congestion remediation message and, in response, removing the sender device information from the database.

17. The method of claim 14, further comprising:
associating, by the networking device, a sender notification indicator with the sender device information in the database in response to providing the second congestion notification in the second packet; and
receiving, by the networking device, a third packet that includes the sender device information that is stored in the database and not providing a congestion notification in the third packet in response to the sender notification indicator being associated with the sender device information in the database.

18. The method of claim 14, further comprising:
calculating, by the networking device, a second checksum for the second packet in response to providing the second congestion notification in the second packet; and
replacing, by the networking device, a first checksum in the second packet with the second checksum.

19. The method of claim 14, further comprising:
removing, by the networking device, the sender device information from the database in response to determining that a predetermined time period has passed.

20. The method of claim 14, further comprising:
providing, by the receiver device, the second congestion notification in a third packet that is sent to the sender device in response to receiving the first packet with the first congestion notification from the networking device.

* * * * *